United States Patent [19]

Wogoman

[11] Patent Number: 4,526,445
[45] Date of Patent: Jul. 2, 1985

[54] OPTICAL WINDOW WITH VACUUM FILM HOLDER

[75] Inventor: Frank Wogoman, South Bend, Ind.

[73] Assignee: Miles Laboratories, Inc., Elkhart, Ind.

[21] Appl. No.: 491,992

[22] Filed: May 5, 1983

[51] Int. Cl.³ .................. G02B 21/34; B25B 11/00
[52] U.S. Cl. ........................................ 350/534; 269/21
[58] Field of Search ............... 350/529, 534–536; 356/239, 244; 248/362.3; 279/3; 269/21; 355/73; 209/905

[56] References Cited

U.S. PATENT DOCUMENTS

| 1,882,919 | 10/1932 | Robbins | 350/529 |
| 2,235,310 | 3/1941 | Bausch | 350/535 |
| 3,572,794 | 3/1971 | Sepall | 356/239 |
| 3,848,962 | 11/1974 | Nelson | 350/529 |
| 4,197,005 | 4/1980 | Sippel | 248/363 |
| 4,205,914 | 6/1980 | Anderson et al. | 356/239 |
| 4,448,404 | 5/1984 | Ogawa et al. | 269/21 |

FOREIGN PATENT DOCUMENTS

| 965768 | 8/1964 | United Kingdom | 355/73 |
| 1453953 | 10/1976 | United Kingdom | 355/73 |

OTHER PUBLICATIONS

Wirtz et al, "Holding Fixture for Thickness Measuring Apparatus" IBM Tech. Disc. Bull, 8-1979, pp. 1105.
Fisher, "Microscope Slides", Fisher Scientific Cat. 1963, pp. 700–701.

Primary Examiner—William H. Punter
Attorney, Agent, or Firm—Roger N. Coe

[57] ABSTRACT

Apparatus is disclosed for mounting a specimen and retaining the specimen flat against an optical viewing area by means of vacuum without any mechanical contact being applied to the top of the specimen. The apparatus comprises a plate having an optical viewing area which is surrounded by a vacuum cavity. The vacuum cavity is connected to a vacuum port on an edge of the plate via a vacuum tube which extends through the plate.

6 Claims, 3 Drawing Figures

OPTICAL WINDOW WITH VACUUM FILM HOLDER

BACKGROUND OF THE INVENTION

1. Field of the Invention

The present invention relates to a device for maintaining a specimen securely mounted over a viewing window and, more particularly, to apparatus for rapidly and accurately mounting a film specimen flat over a viewing window without mechanical contact.

Applications exist where it is important to mount, position and observe a film specimen for analysis over a viewing window in such a way (1) that there is no mechanical contact applied from the top of the specimen to hold it against the viewing window, (2) that the specimen is held flat against the viewing window, and (3) that the thickness of the apparatus or device for maintaining the specimen in place not exceed approximately 0.07 inch (1.75 mm). It is essential in such apparatus that the film specimen be held firmly in place for observation with a microscope or other means, that the apparatus employed to hold the specimen in place not obstruct the viewing area of interest and that the apparatus employed to hold the specimen in place prevent any deformation of the specimen in the area of viewing interest.

Vacuum means for maintaining specimens in place have been known for years, but prior to the present invention no known system had the capability of achieving the desiderata mentioned above in which a film specimen could be quickly, easily, firmly and accurately mounted.

2. Description of the Prior Art

Holding objects in place with a vacuum has been done for many years. U.S. Pat. No. 3,723,006 discloses apparatus which can be used for holding particulate specimens, but the disclosed apparatus is not capable of mounting film specimens for inspection or analysis over a viewing window.

U.S. Pat. Nos. 3,029,695 and 3,031,924 are directed to microscope slides having sealed specimen chambers interiorly thereof. The sealed specimen chamber can be partially evacuated. The purpose of the vacuum, however, is not to retain the specimen in place. Moreover, such specimen chambers do not provide easy, quick, convenient mounting of specimens; do not insure that the specimen will be maintained flat against the viewing area; and do not prevent the specimen from being distorted and/or contaminated by the means employed to mount and retain the specimen in the microscope slide.

SUMMARY OF THE INVENTION

An object of the present invention is to provide an optical window with a vacuum holder for maintaining a film specimen flat against the optical window without mechanical contact applied from the top of the specimen.

Another object of the present invention is to provide apparatus for holding a film specimen in place over a viewing window in which the apparatus has a thickness of not more than about 0.07 inch.

Yet another object of the present invention is to provide apparatus for rapidly and accurately mounting a film specimen for inspection and/or analysis over an optical window in a manner which prevents sample distortion or contamination.

In accordance with the present invention, a plate is provided with an optical window surrounded by a vacuum cavity connected to a vacuum port. The apparatus has particular application for mounting a film type specimen over the optical window where it is held in place by vacuum applied from the vacuum cavity. Thus, a single plate serves not only the function of a viewing window, but also to maintain the specimen flat over the viewing window. The vacuum cavity holds the specimen in place without obstructing the viewing area and maintains the specimen flat against the viewing area without any mechanical contact applied from the top of the specimen. By holding the specimen flat against the viewing window deformation of the specimen in the area of viewing interest is prevented.

BRIEF DESCRIPTION OF THE DRAWINGS

Other and further objects, advantages and features of the invention will be apparent to those skilled in the art from the following detailed description thereof, taken in conjunction with the accompanying drawings in which.

Figure 1:
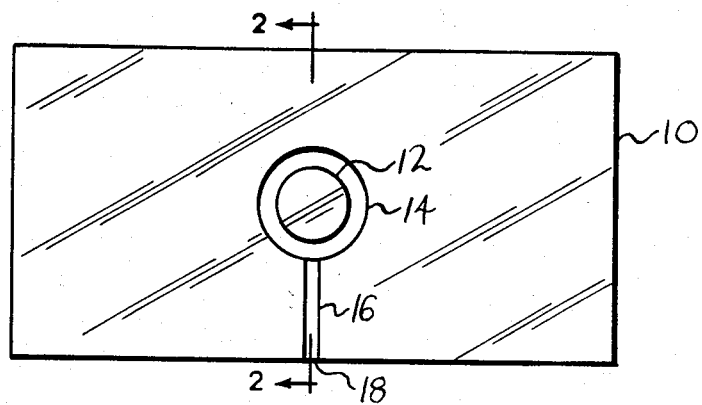
FIG. 1 is a top plan view of a plate in accordance with the present invention which embodies an optical window, a vacuum cavity and a vacuum port.
Figure 2:
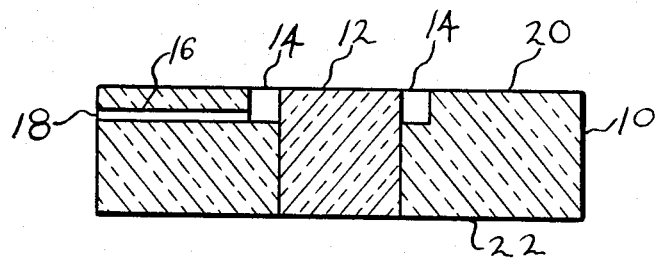
FIG. 2 is an enlarged side view, in cross section, taken along lines 2—2 of FIG. 1.
Figure 3:
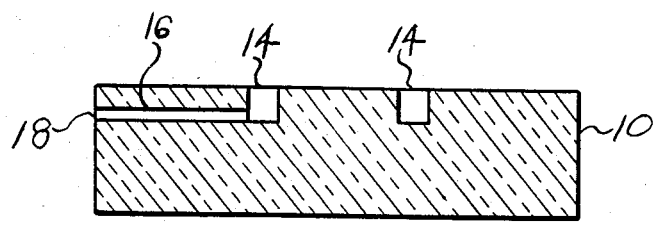
FIG. 3 is an enlarged side view, in cross section, of a plate similar to that of FIG. 2 in which the entire plate is made from the same transparent material.

It should be understood that FIGS. 2 and 3 have been drawn to an enlarged scale (compared to FIG. 1) for purposes of clarity in order to facilitate a clear understanding of the invention. Moreover, it will be appreciated that even the apparatus of FIG. 1 has been drawn to a scale larger than normal since microscope slides normally range from 3×1 inches up to 3¼×4 inches with standard thicknesses ranging from between 1.10 and 1.75 mm.

DESCRIPTION OF THE PREFERRED EMBODIMENTS

The apparatus forming the subject matter of the present invention is characterized by a plate having an optical window, a vacuum cavity surrounding the optical window and a vacuum port which permits the specimen to be held flat against the optical window when vacuum is applied via the vacuum port. In a preferred embodiment, the plate is a glass slide having a thickness of 0.07 inch or less and the vacuum cavity surrounding the optical window or viewing area is circular.

Referring to FIGS. 1 and 2 of the drawings, plate 10 contains an optical window 12 surrounded by vacuum cavity 14 which is interconnected with vacuum tube 16. Vacuum tube 16 extends from vacuum cavity 14 to an edge of plate 10 terminating in vacuum port or opening 18.

Plate 10 is illustrated as a transparent material in the drawings. Preferably plate 10 is a glass microscope slide. However, any suitable material can be used for plate 10 including metal such as aluminum; plastic, such as polystyrene, polypropylene, polymethylmethacrylate, etc. The thickness of plate 10 should be about 0.07 inch or less and preferably 0.05 inch or less. Opposing surfaces 20 and 22 should be parallel to each other.

Optical window 12 should be designed to be of sufficient size and have sufficient clarity to permit examination without difficulty using a microscope or other suitable means. Typically, optical window 12 is made of glass or other suitable transparent material such as plastic. Plate 10 can be made of material identical to that of optical window 12. Thus plate 10 and optical window 12 do not have to be separate and distinct (see FIG. 3). If plate 10, on the other hand, is made from a nontransparent material or from a material which does not have good optical characteristics, optical window 12 must be made from a material other than that of plate 10 and must have good viewing characteristics whether that material be plastic, quartz, glass, or the like.

Vacuum cavity 14 surrounds optical window 12 and preferably is circular in configuration due to ease of manufacturing. However, any suitable configuration for the vacuum cavity can be employed and the dimensions of vacuum cavity 14 can be adjusted to meet the requirements of particular samples being mounted and analyzed. Vacuum applied by the vacuum cavity holds the specimen flat against optical window 12 across the viewing area without any required mechanical contact applied to the top of the specimen. The vacuum cavity can be molded at the time of forming plate 10 or subsequently cut to provide the desired cavity or channel 14. Alternatively, plate 10 can be made from a series of thin layers laminated together (not shown) to form vacuum cavity 14 and vacuum tube 16. Configurations other than rectangular cavities can be utilized. For example, the cavity could have a v-shaped or a u-shaped configuration if desired.

Vacuum tube 16 interconnects vacuum port 18 with vacuum cavity 14. Vacuum tube 16 can be made during the formation of plate 10, can be drilled after the formation of plate 10 or can be formed as a channel in surface 20 of plate 10 and then covered or sealed by suitable means, such as tape, to form vacuum tube 16 having an opening or port 18 in one edge of plate 10. By applying vacuum to vacuum port 18, vacuum is applied to a sample, via vacuum cavity 14, which is sufficient to maintain the specimen flat against the viewing area of the optical window without the need for any separate mechanical system for holding down the specimen.

From the foregoing, it will be seen that this invention is well adapted to attain all of the ends and objects hereinabove set forth, together with other advantages which are obvious and which are inherent to the system. The apparatus of the present invention has the advantages of convenience, simplicity, relatively inexpensiveness, positiveness, effectiveness, durability, accuracy and directness of action. The invention substantially overcomes problems of distortion, contamination and manipulation of specimens. Problems associated with loss of delicate samples due to physical destruction of the samples during the manipulation required to position the sample for observation or analysis are essentially eliminated. Since a plate having a thickness of 0.07 inch or less can be used for both viewing and holddown ordinary microscopic observation is facilitated. No modification of standard observation equipment is necessary or required. The specimen is held firmly in place on the plate and can be rapidly and easily positioned or orientated. The apparatus also permits rapid cleaning of the optical window area enabling the apparatus to be reused.

If desired, concentric or nonconcentric connected vacuum cavities can be employed to improve the retention capacity of the apparatus.

Obviously, many other modifications and variations of the invention as hereinbefore set forth can be made without departing from the spirit and scope thereof.

What is claimed is:

1. Apparatus for mounting a specimen for analysis over an optical viewing area, which apparatus comprises:
   a plate, with an optical window extending therebetween, said optical window having parallel top and bottom sides and a thickness not exceeding about 0.07 inch;
   a vacuum trough, open at the top side of said plate and extending completely around said optical window, for holding a specimen flat against the optical window during analysis; and
   a vacuum tube interconnecting the vacuum trough with a vacuum port in the edge of said plate.

2. The apparatus of claim 1 in which the optical window is glass.

3. The apparatus of claim 1 in which the optical window is quartz.

4. The apparatus of claim 1 in which the optical window is plastic.

5. The apparatus of claim 1 in which the vacuum trough is V-shaped.

6. The apparatus of claim 1 in which the vacuum trough is U-shaped.

* * * * *